Sept. 29, 1942.     A. BOWEN     2,297,345
SURROUND FOR PROJECTED IMAGES
Filed July 15, 1940
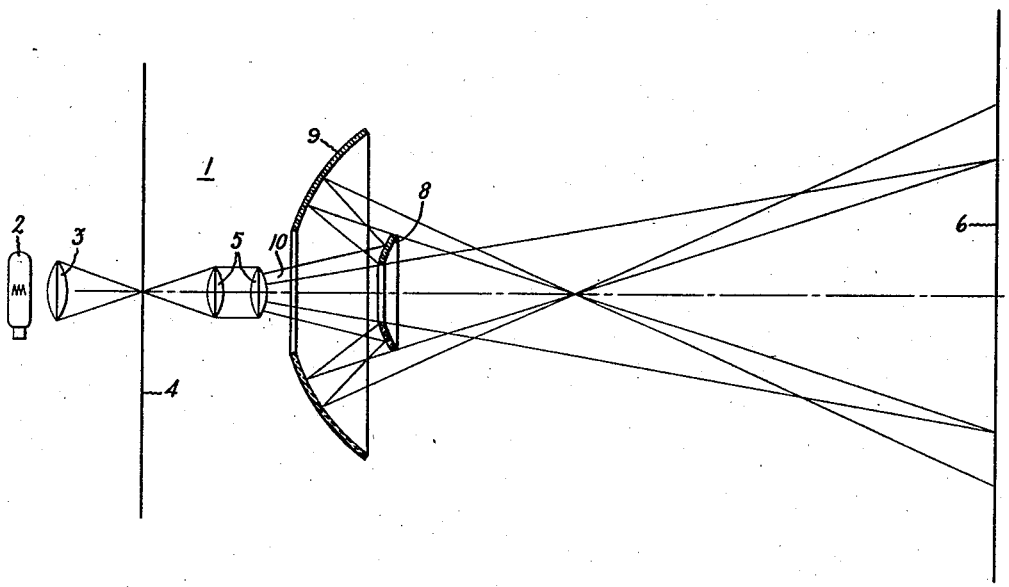
Inventor:
Arthur Bowen,
by Harry E. Dunham
His Attorney.

Patented Sept. 29, 1942

2,297,345

UNITED STATES PATENT OFFICE 2,297,345

SURROUND FOR PROJECTED IMAGES

Arthur Bowen, Coventry, England, assignor to General Electric Company, a corporation of New York Application July 15, 1940, Serial No. 345,684
In Great Britain July 27, 1939

4 Claims. (Cl. 88—24)

My invention relates to the production of illuminated surrounds for optically projected images and it has for its object the provision of improved apparatus for producing such surrounds, which apparatus is simple in construction, efficient in operation and inexpensive to manufacture.

In accordance with my invention, I provide two light reflectors, one of which I arrange in such a manner that it reflects the fringing parts of the projected beam and the other I arrange to redirect said rays toward the image produced by the projector thereby forming a surround for the image.

My invention will be better understood from the following description taken in connection with the accompanying drawing, and its scope will be pointed out in the appended claims.

In the single figure of the drawing which is a vertical sectional view of an embodiment of my invention showing also the directions of the reflected light rays, 1 represents a motion picture projector of which 2 is the light source, 3 is the condensing lens, 4 is the picture film and 5 is the objective or projection lens. At 6 is the screen upon which the picture images are produced.

Arranged in front of the lens is the frame-like reflector 8 which, inasmuch as the pictures are usually rectangular, has a rectangular opening therein of similar shape. This reflector preferably has a convex reflecting surface, the reflector being so positioned with respect to the light beam that it reflects only the fringing rays of the beam, the shape of the reflector determining the shape of the illuminated border surrounding the projected image. Arranged rearwardly of the reflector 8 is the concave reflector 9 which may be annular in form and so arranged with respect to the reflector 8 that it reflects or redirects toward the screen the fringing rays reflected on it by the reflector 8. As shown by the drawing the band 10 of fringing rays surrounding the main beam are first reflected rearwardly by the reflector 8 and are then redirected forwardly by the reflector 9, the rays passing through a focal point finally to produce the illuminated margin or surround on the screen for the image. Both reflectors 8 and 9 may consist of polished metal or silvered glass. However, I prefer to use polished metal for the reflector 8 and silvered glass for the reflector 9.

While my invention is especially desirable in connection with the projection of images in color, it is also beneficial when the projected image is in black and white. The tone and brightness of the surround follows the average color value and brightness of the image being projected, and tends to make the viewing of the image more restful to the eyes of the observer and to give a sense of depth to the image.

While I have illustrated my invention as applied to a motion picture projector, it will be understood that it is equally applicable to a television image projector.

What I claim as new and desire to secure by Letters Patent of the United States is:

1. In combination with a picture projector having a light source and an objective for projecting light in a divergent beam on a screen to form an image thereon, a plurality of cooperating reflectors positioned beyond said objective and arranged to redirect light of said beam limited to fringing rays thereof toward said screen to form a surround for said image.

2. In combination with a picture projector having a light source and an objective for projecting light in a divergent beam on a screen to form an image, means arranged between said objective and said screen for reflecting rearwardly light of said beam limited to fringing rays thereof and means for redirecting said rays forwardly to form a surround for said image.

3. In combination with a picture projector having a light source and an objective for projecting light in a divergent beam on a screen to form an image, a first ring-like reflector through which the major part of said beam freely passes, and a second ring-like reflector through which all of said beam passes positioned rearwardly of said first reflector, fringing rays of said beam being reflected by said first reflector on said second reflector from which they are reflected on said screen to form a margin for said image.

4. In combination with a picture projector having a light source and an objective for projecting light in a divergent beam on a screen to form an image, a first ring-like reflector coaxial with and arranged at a predetermined point of said beam, the opening in said reflector being somewhat smaller than the beam at said point whereby the fringing rays of the beam are reflected rearwardly, and a second ring-like reflector surrounding said beam between said objective and the first reflector for reflecting forwardly on said screen the rays reflected by the first reflector to form a margin for said image.

ARTHUR BOWEN.